(12) United States Patent
Djebara et al.

(10) Patent No.: US 9,837,216 B2
(45) Date of Patent: Dec. 5, 2017

(54) CARRIER WIRE FOR SOLID ELECTROLYTIC CAPACITORS

(71) Applicant: AVX Corporation, Fountain Inn, SC (US)

(72) Inventors: Lotfi Djebara, Paris (FR); Radek Matousek, Trebova (CZ); Ludek Kubes, Lanskroun (CZ)

(73) Assignee: AVX Corporation, Fountain Inn, SC (US)

( * ) Notice: Subject to any disclaimer, the term of this patent is extended or adjusted under 35 U.S.C. 154(b) by 43 days.

(21) Appl. No.: 14/574,432

(22) Filed: Dec. 18, 2014

(65) Prior Publication Data

US 2016/0181022 A1 Jun. 23, 2016

(51) Int. Cl.
  *H01G 9/15* (2006.01)
  *H01G 9/012* (2006.01)
  *H01G 9/052* (2006.01)

(52) U.S. Cl.
  CPC .............. *H01G 9/15* (2013.01); *H01G 9/012* (2013.01); *H01G 9/052* (2013.01)

(58) Field of Classification Search
  CPC .......... H01G 9/15; H01G 9/025; H01G 9/028; H01G 9/042
  See application file for complete search history.

(56) References Cited

U.S. PATENT DOCUMENTS

| 3,345,545 A | 10/1967 | Bourgault et al. | |
|---|---|---|---|
| 3,612,957 A * | 10/1971 | Steigerwald | H01G 9/008 29/25.03 |
| 4,097,916 A * | 6/1978 | Piper | H01G 9/012 361/540 |
| 4,330,929 A | 5/1982 | Cripe | |
| 4,409,642 A * | 10/1983 | Edson | H01G 9/012 29/25.03 |
| 4,945,452 A | 7/1990 | Sturmer et al. | |

(Continued)

FOREIGN PATENT DOCUMENTS

| WO | WO 98/49356 | 11/1998 |
|---|---|---|
| WO | WO 2005/106905 A1 | 11/2005 |
| WO | WO 2006/057455 A1 | 6/2006 |

OTHER PUBLICATIONS

Related U.S. Patent Application Form.

(Continued)

*Primary Examiner* — Nguyen Ha
(74) *Attorney, Agent, or Firm* — Dorirty & Manning, P.A.

(57) ABSTRACT

A solid electrolytic capacitor including a capacitor element and an anode lead assembly is provided. The capacitor element includes a sintered, porous anode body; a dielectric layer overlying the sintered, porous anode body; and a cathode overlying the dielectric layer that includes a solid electrolyte. The anode lead assembly includes a first anode lead having an embedded portion positioned within the anode body and an external portion extending from a surface of the anode body in a longitudinal direction. The external portion includes a substantially planar surface. Meanwhile, the second anode lead is positioned external to the anode body and includes a first portion and a second portion. The first portion has a substantially planar surface that is connected to the substantially planar surface of the external portion of the first anode lead.

21 Claims, 6 Drawing Sheets

(56) References Cited

U.S. PATENT DOCUMENTS

| | | |
|---|---|---|
| 5,111,327 A | 5/1992 | Blohm et al. |
| 5,179,507 A | 1/1993 | Iijima |
| 5,357,399 A | 10/1994 | Salisbury |
| 5,457,862 A | 10/1995 | Sakata et al. |
| 5,469,326 A | 11/1995 | Kanetake |
| 5,473,503 A | 12/1995 | Sakata et al. |
| 5,729,428 A | 3/1998 | Sakata et al. |
| 5,812,367 A | 9/1998 | Kudoh et al. |
| 5,949,639 A | 9/1999 | Maeda et al. |
| 6,191,936 B1 | 2/2001 | Webber et al. |
| 6,197,252 B1 | 3/2001 | Bishop et al. |
| 6,238,444 B1 | 5/2001 | Cadwallader |
| 6,322,912 B1 | 11/2001 | Fife |
| 6,380,577 B1 | 4/2002 | Cadwallader |
| 6,391,275 B1 | 5/2002 | Fife |
| 6,416,730 B1 | 7/2002 | Fife |
| 6,447,570 B1 | 9/2002 | Pozdeev-Freeman |
| 6,527,937 B2 | 3/2003 | Fife |
| 6,576,099 B2 | 6/2003 | Kimmel et al. |
| 6,592,740 B2 | 7/2003 | Fife |
| 6,635,729 B1 | 10/2003 | Groenendaal et al. |
| 6,639,787 B2 | 10/2003 | Kimmel et al. |
| 6,665,172 B1 | 12/2003 | Kim et al. |
| 6,674,635 B1 | 1/2004 | Fife et al. |
| 6,813,140 B1 | 11/2004 | Huntington |
| 6,987,663 B2 | 1/2006 | Merker et al. |
| 7,072,171 B1 | 7/2006 | Muffoletto et al. |
| 7,116,548 B2 | 10/2006 | Satterfield, Jr. et al. |
| 7,154,742 B1 | 12/2006 | Hahn et al. |
| 7,220,397 B2 | 5/2007 | Kimmel et al. |
| 7,262,511 B2 | 8/2007 | Osako et al. |
| 7,323,395 B2 | 1/2008 | Huntington |
| 7,341,705 B2 | 3/2008 | Schnitter |
| 7,342,775 B2 | 3/2008 | Hahn et al. |
| 7,359,181 B2 | 4/2008 | Kuriyama |
| 7,381,396 B2 | 6/2008 | Thomas et al. |
| 7,419,926 B2 | 9/2008 | Schnitter et al. |
| 7,515,396 B2 | 4/2009 | Biler |
| 7,594,937 B2 | 9/2009 | Amita et al. |
| 7,646,589 B2 | 1/2010 | Kuriyama |
| 7,687,884 B2 | 3/2010 | Huntington |
| 7,787,235 B2 | 8/2010 | Fujita et al. |
| 7,929,274 B2 | 4/2011 | Reed et al. |
| 8,066,783 B2 | 11/2011 | Takeda |
| 8,313,538 B2 | 11/2012 | Merker et al. |
| 8,416,558 B2 * | 4/2013 | Kurokawa ............. H01G 9/012 361/540 |
| 8,482,902 B2 | 7/2013 | Ishida et al. |
| 8,630,084 B2 | 1/2014 | Saida et al. |
| 8,947,858 B2 | 2/2015 | Djebara et al. |
| 2004/0136144 A1 | 7/2004 | Hirota et al. |
| 2005/0237698 A1 | 10/2005 | Postage et al. |
| 2007/0142147 A1 | 11/2007 | Marek et al. |
| 2009/0103243 A1 | 4/2009 | Mizukoshi et al. |
| 2009/0237867 A1 | 9/2009 | Kurokawa |
| 2009/0279232 A1 | 11/2009 | Druding et al. |
| 2010/0079930 A1 | 4/2010 | Hayashi et al. |
| 2011/0085285 A1 * | 4/2011 | Zednicek ............. H01G 9/10 361/523 |
| 2013/0321985 A1 | 12/2013 | Djebara et al. |
| 2013/0321986 A1 | 12/2013 | Djebara et al. |
| 2015/0055277 A1 * | 2/2015 | Djebara ............. H01G 9/012 361/528 |

OTHER PUBLICATIONS

Abstract of Japanese Patent—JP2001057319 A, Feb. 27, 2001, 2 pages.
Abstract of Japanese Patent—JP2001217160 A, Aug. 10, 2001, 2 pages.
Abstract of Japanese Patent—JP2001307957 A, Nov. 2, 2001, 2 pages.
Abstract of Japanese Patent—JP2003332173 A, Nov. 21, 2003, 2 pages.
Hahn et al., "Strategies for Manufacturing Ultra Low ESR Ta Capacitors," CARTS USA, Mar. 21-24, 2005, Palm Springs, California, 7 pages.
Abstract of Japanese Patent—JPH0722289 A, Jan. 24, 1995, 2 pages.
Abstract of Japanese Patent—JPH088143 A, Jan. 12, 1996, 2 pages.
Abstract of Japanese Patent—JPS5718317 A, Jan. 30, 1982. 1 page.
Abstract of Japanese Patent—JP2000012387 A, Jan. 14, 2000, 2 pages.
Abstract of Japanese Patent—JP2003229327 A, Aug. 15, 2003, 2 pages.
Abstract of Japanese Patent—JP2004253501 A, Sep. 9, 2004, 1 page.
Abstract of Japanese Patent—JP2004281619 A, Oct. 7, 2004, 1 page.
Abstract of Japanese Patent—JP2005033097 A, Feb. 3, 2005, 2 pages.
Abstract of Japanese Patent—JP2006295075 A, Oct. 26, 2006, 1 page.
Abstract of Japanese Patent—JP2008187091 A1, Aug. 14, 2008, 2 pages.
Abstract of Japanese Patent—JP2008305824 A, Dec. 18, 2008, 2 pages.
Abstract of Japanese Patent—JP2009266931 A, Nov. 12, 2009, 2 pages.
Hintz et al., "Anode Lead Wire Pre-Treatments for Improved Lead Wire Bonding in Tantalum Capacitor Anodes Processed by De-Oxidation/Sintering," CARTS USA, Mar. 15-18, 2010, New Orleans, Louisiana, 13 pages.
Vasina et al., "Failure Modes of Tantalum Capacitors Made by Different Technologies," CARTS USA, Mar./Apr. 2001, 6 pages.
Abstract of Japanese Patent — JPH03196511A, Aug. 28, 1991, 1 page.
Abstract of JapanesePatent—JP2003217974A, Jul. 31, 2003, 2 pages.
Abstract of Japanese Patent — JP2004349725A, Dec. 9, 2004, 2 pages.
Abstract of Japanese Patent — JP2011071151A. Apr. 7, 2011, 1 page.

* cited by examiner

CARRIER WIRE FOR SOLID ELECTROLYTIC CAPACITORS

BACKGROUND OF THE INVENTION

Solid electrolytic capacitors (e.g., tantalum capacitors) have been a major contributor to the miniaturization of electronic circuits and have made possible the application of such circuits in extreme environments. The anode of a typical solid electrolytic capacitor includes a porous anode body, with an anode lead extending beyond the anode body and connected to an anode termination of the capacitor. The anode can be formed by first pressing a tantalum powder into a pellet that is then sintered to create fused connections between individual powder particles. One problem with many conventional solid electrolytic capacitors is that the small particle size of the tantalum particles can decrease the volumetric contact between the anode body and the anode lead. In fact, it can be difficult to find many points of contact between the anode lead and the powder particles. When the contact area between the anode body and the anode lead is decreased, there is a corresponding increase in resistance where the anode lead and the anode meet. This increased equivalent series resistance (ESR) results in a capacitor exhibiting decreased electrical capabilities. On the other hand, as the diameter of an anode lead is increased, the internal resistance in the anode lead itself increases, and this increase in internal resistance can counteract any improvement (decrease) in ESR seen as the result of increasing the points of contact between the anode body and the anode lead. Further, increasing the diameter of the anode lead increases the energy required to resistance weld or laser weld the anode lead to an anode termination portion of a leadframe.

As such, a need currently exists for an improved solid electrolytic capacitor that finds a balance between the benefit of increased points of contact between the anode body and the anode lead without the negative effects of increased resistance in the lead itself as its diameter increases, thereby significantly improving electrical capabilities of the capacitor by achieving ultralow ESR levels. A need also exists where such a balance can be found while also minimizing the energy needed to electrically connect the anode lead to an anode termination.

SUMMARY OF THE INVENTION

In accordance with one embodiment of the present invention, a solid electrolytic capacitor is disclosed that includes a capacitor element and an anode lead assembly. The capacitor element includes a sintered, porous anode body; a dielectric layer overlying the sintered, porous anode body; and a cathode overlying the dielectric layer that includes a solid electrolyte. The anode lead assembly includes a first anode lead that has an embedded portion positioned within the sintered, porous anode body and an external portion extending from a surface of the sintered, porous anode body in a longitudinal direction. Further, the external portion includes a substantially planar surface. In addition, the second anode lead is positioned external to the sintered, porous anode body and includes a first portion and a second portion, where the first portion includes a substantially planar surface. Further, the substantially planar surface of the first portion of the second anode lead is connected to the substantially planar surface of the external portion of the first anode lead.

In accordance with another embodiment of the present invention, a method for forming a solid electrolytic capacitor is disclosed. The method includes positioning a first anode lead within a powder formed from a valve metal composition such that the first anode lead includes an embedded portion located within a porous anode body and an external portion extending from a surface of the anode body in a longitudinal direction, wherein the external portion includes a substantially planar surface; compacting the powder around the embedded portion of the first anode lead; sintering the compacted powder to form a sintered, porous anode body; positioning a second anode lead external to the sintered, porous anode body, wherein the second anode lead comprises a first portion and a second portion, wherein the first portion includes a substantially planar surface; connecting the substantially planar surface of the first portion of the second anode lead to the substantially planar surface of the external portion of the first anode lead; and connecting the second portion of the second anode lead to an anode termination to form an electrical connection between the second portion of the second anode lead and the anode termination.

Other features and aspects of the present invention are set forth in greater detail below.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

Figure 1:
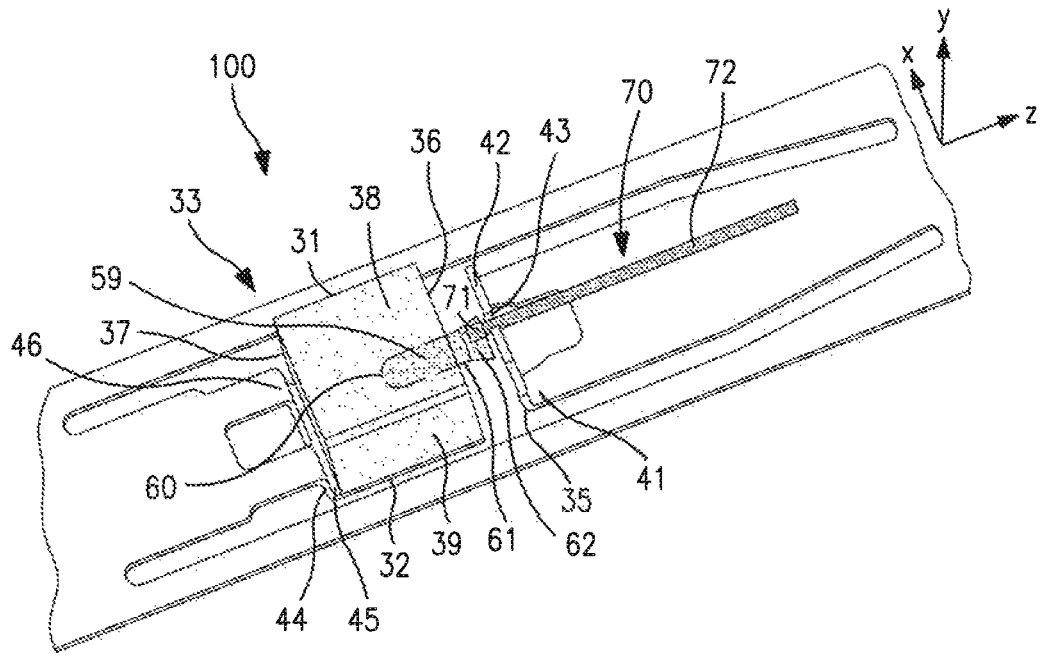
FIG. 1 is a perspective top view of one embodiment of an electrolytic capacitor of the present invention.

Repeat use of reference characters in the present specification and drawings is intended to represent the same or analogous features or elements of the present invention.

DETAILED DESCRIPTION OF REPRESENTATIVE EMBODIMENTS

It is to be understood by one of ordinary skill in the art that the present discussion is a description of exemplary embodiments only, and is not intended to limit the broader aspects of the present invention.

Generally speaking, the present invention is directed to a solid electrolytic capacitor containing a capacitor element that includes a sintered porous anode body, a dielectric layer overlying the sintered porous anode body, and a cathode overlying the dielectric layer that includes a solid electrolyte. The capacitor also includes an anode lead assembly having a first anode lead and a second anode lead. The first anode lead has an embedded portion positioned within the porous anode body and an external portion extending from a surface of the porous anode body in a longitudinal direction. The external portion of the first anode lead includes a substantially planar surface. The substantially planar surface can be formed by flattening, crimping, or otherwise altering the geometry of all or a part of the external portion of the first anode lead. As a result, in some embodiments, all or part of the external portion of the first anode lead can have a dimension (e.g., a height/thickness) that is smaller than a corresponding dimension (e.g., a height/thickness) of the embedded portion. Further, the capacitor includes a second anode lead positioned external to the porous anode body, where the second anode lead includes a first portion and a second portion, where the first portion includes a substantially planar surface. The substantially planar surface can be formed by flattening, crimping, or otherwise altering the geometry of the first portion of the second lead wire. As a result, in some embodiments, the first portion of the second anode lead has a dimension (e.g., a height/thickness) that is smaller than a corresponding dimension (e.g., a height/thickness) of the second portion of the second anode lead. In addition, the substantially planar surface of the first portion of the second anode lead is in contact with the substantially planar surface of the external portion of the first anode lead, where the substantially planar surfaces facilitate the welding of the second anode lead to the first anode lead by ensuring that the surfaces of the two anode leads that are in contact with each other are both generally flat or level such that an adequate connection can be made. By utilizing a first anode lead having an external portion that has a substantially planar surface and a second anode lead having a first portion that has a substantially planar surface, the present inventors have found that the external portion of the first anode lead and the first portion of the second anode lead can be more effectively and easily connected together by resistance welding.

Further still, the first anode lead and the second anode lead can be made of different materials. For instance, the first anode lead can be tantalum, while the second anode lead can be a non-tantalum material (e.g., stainless steel, nickel, or a nickel-iron alloy). In this manner, a more cost-effective leadframe assembly can be utilized, as the material cost for the second anode lead, which can serve as a carrier wire during the production process, can be less than the material cost for the first anode lead. In such embodiments, using a non-tantalum second anode lead to carry the anodes during chemical processes such as anodization and cathode buildup can reduce material costs. For instance, as part of the second portion of the second anode lead (e.g., carrier wire) is eventually trimmed away from the capacitor itself and is not needed as a component of the final capacitor product, a less expensive material can be used as compared to the first anode lead. However, it is also to be understood that, in some embodiments, the first anode lead can be non-tantalum, and, in some embodiments, the second anode lead can be tantalum. For example, both the first and second anode leads can be tantalum, both the first and second anode leads can be non-tantalum, or the first anode lead can be non-tantalum and the second anode lead can be tantalum.

Moreover, the embedded portion of the first anode lead can have a thickness/height, where it is to be understood that terms thickness and height can also refer to the diameter when the anode lead is circular, that can be larger than a thickness/height or diameter of the second portion of the second anode lead. For instance, the embedded portion of the first anode lead can have a thickness/height or diameter of from about 100 micrometers to about 2000 micrometers, while the second portion of the second anode lead can have a thickness/height or diameter of from about 10 micrometers to about 1800 micrometers. In addition, the second portion of the second anode lead can have a thickness/height or diameter that is from about 10% to about 90% of the thickness/height or diameter of the embedded portion of the first anode lead.

The present inventors have found that when the embedded portion of the first anode lead has an increased thickness/height or diameter, the area of contact between the embedded portion of the first anode lead and the anode body is increased, thus reducing ESR by decreasing the resistance at the points of contact between the first anode lead and the anode body. However, as the thickness/height or diameter of an anode lead increases, the internal resistance of the anode lead also increases. Thus, in order to reduce the impact of the increased internal resistance of the embedded portion of the first anode lead resulting from the increase in the thickness/height or diameter of the first anode lead, the length of the external portion of the first anode lead can be minimized. Thus, as a component of the final capacitor, the external portion of the first anode lead can have a total length (i.e., the length of the first external portion and the second external portion) of from about 1 micrometer to about 10 millimeters, while the second anode lead (i.e., the length of the first portion and the second portion) can have a length of from about 1 micrometer to about 20 millimeters. With such a two anode lead configuration, the present inventors have found that the ESR of the resulting capacitor can be reduced.

Moreover, because the overall height/thickness or diameter of the second anode lead, as represented by the second portion of the second anode lead, can be less than the overall height/thickness or diameter of the first anode lead, as represented by the embedded portion, various processing steps can be simplified because an anode lead having a smaller height/thickness or diameter is easier to manipulate than an anode lead having a larger height/thickness or diameter, and the overall stability of the anode lead assembly can be increased because there is less risk that the second anode lead will bend due to its smaller height/thickness or diameter when compared to the first anode lead. Moreover, using a second anode lead having a smaller height/thickness or diameter to carry the anodes during chemical processes such as anodization and cathode buildup can reduce material costs, as a portion of the second anode lead (e.g., carrier wire) is eventually trimmed away from the capacitor itself and is not needed as a component of the final capacitor product.

Various embodiments of the present invention will now be described in more detail.

I. Capacitor Element

The capacitor element of the present invention includes an anode, a dielectric layer, and a cathode, as well as optional additional layers, each of which are each described in more detail below.

A. Anode

The porous anode body of the capacitor of the present invention can typically be formed from a valve metal composition having a high specific charge, such as about 2,000 µF*V/g or more, in some embodiments about 5,000 µF*V/g or more, in some embodiments about 10,000 µF*V/g or more. For instance, such powders can have a specific charge of from about 10,000 to about 600,000 µF*V/g, in some embodiments from about 40,000 to about 500,000 µF*V/g, in some embodiments from about 70,000 to about 400,000 µF*V/g, in some embodiments from about 100,000 to about 350,000 µF*V/g, and in some embodiments, from about 150,000 to about 300,000 µF*V/g. As is known in the art, the specific charge may be determined by multiplying capacitance by the anodizing voltage employed, and then dividing this product by the weight of the anodized electrode body.

The valve metal composition contains a valve metal (i.e., a metal that is capable of oxidation) or a valve metal-based compound, such as tantalum, niobium, aluminum, hafnium, titanium, alloys thereof, oxides thereof, nitrides thereof, and so forth. For example, the valve metal composition may contain an electrically conductive oxide of niobium, such as niobium oxide having an atomic ratio of niobium to oxygen of $1:1.0\pm1.0$, in some embodiments $1:1.0\pm0.3$, in some embodiments $1:1.0\pm0.1$, and in some embodiments, $1:1.0\pm0.05$. For example, the niobium oxide may be $NbO_{0.7}$, $NbO_{1.0}$, $NbO_{1.1}$, and $NbO_2$. In a preferred embodiment, the composition contains $NbO_{1.0}$, which is a conductive niobium oxide that may remain chemically stable even after sintering at high temperatures. Examples of such valve metal oxides are described in U.S. Pat. No. 6,322,912 to Fife; U.S. Pat. No. 6,391,275 to Fife et al.; U.S. Pat. No. 6,416,730 to Fife et al.; U.S. Pat. No. 6,527,937 to Fife; U.S. Pat. No. 6,576,099 to Kimmel, et al.; U.S. Pat. No. 6,592,740 to Fife, et al.; and U.S. Pat. No. 6,639,787 to Kimmel, et al.; and U.S. Pat. No. 7,220,397 to Kimmel, et al., as well as U.S. Patent Application Publication Nos. 2005/0019581 to Schnitter, 2005/0103638 to Schnitter, et al.; 2005/0013765 to Thomas, et al., of which are incorporated herein in their entirety by reference thereto for all purposes.

To form the anode, a powder of the valve metal composition is generally employed. The powder may contain particles any of a variety of shapes, such as nodular, angular, flake, etc., as well as mixtures thereof. Particularly suitable powders are tantalum powders available from Cabot Corp. (e.g., C255 flake powder, TU4D flake/nodular powder, etc.) and H.C. Starck (e.g., NH175 nodular powder). Although not required, the powder may be agglomerated using any technique known in the art, such as through heat treatment. Prior to forming the powder into the shape of an anode, it may also be optionally mixed with a binder and/or lubricant to ensure that the particles adequately adhere to each other when pressed to form the anode body. The resulting powder may then be compacted to form a pellet using any conventional powder press device. For example, a press mold may be employed that is a single station compaction press containing a die and one or multiple punches. Alternatively, anvil-type compaction press molds may be used that use only a die and single lower punch. Single station compaction press molds are available in several basic types, such as cam, toggle/knuckle and eccentric/crank presses with varying capabilities, such as single action, double action, floating die, movable platen, opposed ram, screw, impact, hot pressing, coining or sizing.

Regardless of its particular composition, referring to FIG. 1, the powder is compacted around an embedded portion 60 of a first anode lead 59 so that a first external portion 61 and a second external portion 62 of the first anode lead 59 extends from the compacted porous anode body 33, as shown in FIG. 1 and as will be discussed in more detail below. It should be understood, however, that although FIGS. 1-8 show a first anode lead 59 having a first external portion 61 and a second external portion 62, where only the second external portion 62 has a reduced height/thickness compared to the embedded portion 60 of the first anode lead 59, this is not required, and, in some embodiments, the entire external portion of the first anode lead 59 can have a reduced height/thickness compared to the embedded portion 60 of the first anode lead 59. In one particular embodiment, a press mold may be employed that includes a die having two or more portions (e.g., upper and lower portions). During use, the portions of the die may be placed adjacent to each other so that their walls are substantially aligned to form a die cavity having the desired shape of the anode. Before, during, and/or after loading a certain quantity of powder into the die cavity, the embedded portion 60 of the first anode lead 59 may be embedded therein. The die may define a single or multiple slots that allow for the insertion of the anode lead. After filling the die with powder and embedding the first anode lead therein, the die cavity may then be closed and subjected to compressive forces by a punch. Typically, the compressive forces are exerted in a direction that is either generally parallel or generally perpendicular to the length of the first anode lead, which extends in the longitudinal direction axis (i.e., the z-axis in FIGS. 1-8). This forces the particles into close contact with the first anode lead and creates a strong lead-to-powder bond.

Any binder/lubricant may be removed after pressing by heating the pellet under vacuum at a certain temperature (e.g., from about 150° C. to about 500° C.) for several minutes. Alternatively, the binder/lubricant may also be removed by contacting the pellet with an aqueous solution, such as described in U.S. Pat. No. 6,197,252 to Bishop, et al., which is incorporated herein in its entirety by reference thereto for all purposes. Thereafter, the porous anode body is sintered to form a porous, integral mass. The pellet is typically sintered at a temperature of from about 1200° C. to about 2000° C., in some embodiments from about 1300° C. to about 1900° C., and in some embodiments, from about 1500° C. to about 1800° C., for a time of from about 5 minutes to about 100 minutes, and in some embodiments, from about 30 minutes to about 60 minutes. If desired, sintering may occur in an atmosphere that limits the transfer of oxygen atoms to the anode. For example, sintering may occur in a reducing atmosphere, such as in a vacuum, inert gas, hydrogen, etc. The reducing atmosphere may be at a pressure of from about 10 Torr to about 2000 Torr, in some embodiments from about 100 Torr to about 1000 Torr, and in some embodiments, from about 100 Torr to about 930 Torr. Mixtures of hydrogen and other gases (e.g., argon or nitrogen) may also be employed.

In the particular embodiments shown in FIGS. 1-7, the sintered, porous anode body 33 is in the shape of a rectangular pellet. In addition to having a rectangular shape, however, the anode can have a cubed, cylindrical, circular, or any other geometric shape. The anode may also be "fluted" in that it may contain one or more furrows, grooves, depressions, or indentations to increase the surface to volume ratio to minimize ESR and extend the frequency response of the capacitor. Such "fluted" anodes are described, for instance, in U.S. Pat. No. 6,191,936 to Webber, et al.; U.S. Pat. No. 5,949,639 to Maeda, et al.; and U.S. Pat. No. 3,345,545 to Bourgault et al., as well as U.S. Patent Application Publication No. 2005/0270725 to Hahn, et al., all of which are incorporated herein in their entirety by reference thereto for all purposes.

Referring to FIGS. 1-7, capacitors 100 and 200 of the present disclosure can include a porous anode body 33 formed as discussed above in conjunction with an anode lead assembly 50 containing a first anode lead 59 and a second anode lead 70, as discussed in more detail below. Generally, FIG. 1 is a perspective top view of the porous anode body 33 that is formed around first anode lead 59 and shows the arrangement and dimensions of the porous anode body 33, the first anode lead 59, and the second anode lead 70. For instance, the porous anode body 33 (and capacitor element formed therefrom) can have a first side surface 31, a second side surface 32, a front surface 36, a rear surface 37, an upper surface 38, and a lower surface 39. Referring to FIGS. 3-7, the porous anode body 33 can also have a width W that can refer, for example, to the width of the front surface 36 along the x-axis, and a height H that can refer, for example, to the height or thickness of the front surface 36 along the y-axis. The width W of the front surface 36 of the porous anode body 33 can range from about 200 micrometers to about 8000 micrometers, in some embodiments, from about 400 micrometers to 6000 micrometers, and in some embodiments, from about 600 micrometers to about 4000 micrometers. Additionally, the height H of the front surface 36 of the porous anode body 33 can range from about 200 micrometers to about 8000 micrometers, in some embodiments from about 400 micrometers to about 6000 micrometers, and in some embodiments from about 600 micrometers to about 4000 micrometers.

B. Dielectric

Although not shown, it is to be understood that a dielectric overlies or coats the porous anode body. The dielectric may be formed by anodically oxidizing ("anodizing") the sintered anode so that a dielectric layer is formed over and/or within the anode body. For example, a tantalum (Ta) anode body may be anodized to tantalum pentoxide ($Ta_2O_5$). Typically, anodization is performed by initially applying a solution to the anode body, such as by dipping the anode body into the electrolyte. A solvent is generally employed, such as water (e.g., deionized water). To enhance ionic conductivity, a compound may be employed that is capable of dissociating in the solvent to form ions. Examples of such compounds include, for instance, acids, such as described below with respect to the electrolyte. For example, an acid (e.g., phosphoric acid) may constitute from about 0.01 wt. % to about 5 wt. %, in some embodiments from about 0.05 wt. % to about 0.8 wt. %, and in some embodiments, from about 0.1 wt. % to about 0.5 wt. % of the anodizing solution. If desired, blends of acids may also be employed.

A current is passed through the anodizing solution to form the dielectric layer. The value of the formation voltage manages the thickness of the dielectric layer. For example, the power supply may be initially set up at a galvanostatic mode until the required voltage is reached. Thereafter, the power supply may be switched to a potentiostatic mode to ensure that the desired dielectric thickness is formed over the entire surface of the anode body. Of course, other known methods may also be employed, such as pulse or step potentiostatic methods. The voltage at which anodic oxidation occurs typically ranges from about 4 to about 250 V, and in some embodiments, from about 9 to about 200 V, and in some embodiments, from about 20 to about 150 V. During oxidation, the anodizing solution can be kept at an elevated temperature, such as about 30° C. or more, in some embodiments from about 40° C. to about 200° C., and in some embodiments, from about 50° C. to about 100° C. Anodic oxidation can also be done at ambient temperature or lower. The resulting dielectric layer may be formed on a surface of the anode body and within its pores.

C. Solid Electrolyte

The capacitor element also contains a solid electrolyte that functions as the cathode for the capacitor. A manganese dioxide solid electrolyte may, for instance, be formed by the pyrolytic decomposition of manganous nitrate ($Mn(NO_3)_2$). Such techniques are described, for instance, in U.S. Pat. No. 4,945,452 to Sturmer, et al., which is incorporated herein in its entirety by reference thereto for all purposes.

Alternatively, the solid electrolyte may be formed from one or more conductive polymer layers. The conductive polymer(s) employed in such can be π-conjugated and have electrical conductivity after oxidation or reduction, such as an electrical conductivity of at least about 1 μS cm$^{-1}$ after oxidation. Examples of such π-conjugated conductive polymers include, for instance, polyheterocycles (e.g., polypyrroles, polythiophenes, polyanilines, etc.), polyacetylenes, poly-p-phenylenes, polyphenolates, and so forth. Particularly suitable conductive polymers are substituted polythiophenes having the following general structure:

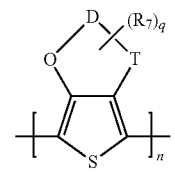

wherein,

T is O or S;

D is an optionally substituted $C_1$ to $C_5$ alkylene radical (e.g., methylene, ethylene, n-propylene, n-butylene, n-pentylene, etc.);

$R_7$ is a linear or branched, optionally substituted $C_1$ to $C_{18}$ alkyl radical (e.g., methyl, ethyl, n- or iso-propyl, n-, iso-, sec- or tert-butyl, n-pentyl, 1-methylbutyl, 2-methylbutyl, 3-methylbutyl, 1-ethylpropyl, 1,1-dimethylpropyl, 1,2-dimethylpropyl, 2,2-dimethylpropyl, n-hexyl, n-heptyl, n-octyl, 2-ethylhexyl, n-nonyl, n-decyl, n-undecyl, n-dodecyl, n-tridecyl, n-tetradecyl, n-hexadecyl, n-octadecyl, etc.); optionally substituted $C_5$ to $C_{12}$ cycloalkyl radical (e.g., cyclopentyl, cyclohexyl, cycloheptyl, cyclooctyl, cyclononyl cyclodecyl, etc.); optionally substituted $C_6$ to $C_{14}$ aryl radical (e.g., phenyl, naphthyl, etc.); optionally substituted $C_7$ to $C_{18}$ aralkyl radical (e.g., benzyl, o-, m-, p-tolyl, 2,3-, 2,4-, 2,5-, 2-6, 3-4-, 3,5-xylyl, mesityl, etc.); optionally substituted $C_1$ to $C_4$ hydroxyalkyl radical, or hydroxyl radical; and q is an integer from 0 to 8, in some embodiments, from 0 to 2, and in one embodiment, 0; and n is from 2 to 5,000, in some embodiments from 4 to 2,000, and in some embodiments, from 5 to 1,000. Example of substituents for the radicals "D" or "$R_7$" include, for instance, alkyl, cycloalkyl, aryl, aralkyl, alkoxy, halogen, ether, thioether, disulphide, sulfoxide, sulfone, sulfonate, amino, aldehyde, keto, carboxylic acid ester, carboxylic acid, carbonate, carboxylate, cyano, alkylsilane and alkoxysilane groups, carboxylamide groups, and so forth.

Particularly suitable thiophene polymers are those in which "D" is an optionally substituted $C_2$ to $C_3$ alkylene radical. For instance, the polymer may be optionally substituted poly(3,4-ethylenedioxythiophene), which has the following general structure:

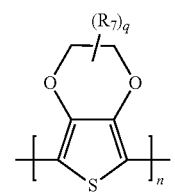

Methods for forming conductive polymers, such as described above, are well known in the art. For instance, U.S. Pat. No. 6,987,663 to Merker, et al., which is incorporated herein in its entirety by reference thereto for all purposes, describes various techniques for forming substituted polythiophenes from a monomeric precursor. The monomeric precursor may, for instance, have the following structure:

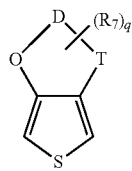

wherein,

T, D, R₇, and q are defined above. Particularly suitable thiophene monomers are those in which "D" is an optionally substituted C₂ to C₃ alkylene radical. For instance, optionally substituted 3,4-alkylenedioxythiophenes may be employed that have the general structure:

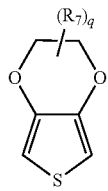

wherein, R₇ and q are as defined above. In one particular embodiment, "q" is 0. One commercially suitable example of 3,4-ethylenedioxythiophene is available from Heraeus Clevios under the designation Clevios™ M. Other suitable monomers are also described in U.S. Pat. No. 5,111,327 to Blohm, et al. and U.S. Pat. No. 6,635,729 to Groenendaal, et al which are incorporated herein in their entirety by reference thereto for all purposes. Derivatives of these monomers may also be employed that are, for example, dimers or trimers of the above monomers. Higher molecular derivatives, i.e., tetramers, pentamers, etc. of the monomers are also suitable for use in the present invention. The derivatives may be made up of identical or different monomer units and used in pure form and in a mixture with one another and/or with the monomers. Oxidized or reduced forms of these precursors may also be employed.

The thiophene monomers may be chemically polymerized in the presence of an oxidative catalyst. The oxidative catalyst typically includes a transition metal cation, such as iron(III), copper(II), chromium(VI), cerium(IV), manganese (IV), manganese(VII), or ruthenium(III) cations, and etc. A dopant may also be employed to provide excess charge to the conductive polymer and stabilize the conductivity of the polymer. The dopant typically includes an inorganic or organic anion, such as an ion of a sulfonic acid. In certain embodiments, the oxidative catalyst employed in the precursor solution has both a catalytic and doping functionality in that it includes a cation (e.g., transition metal) and an anion (e.g., sulfonic acid). For example, the oxidative catalyst may be a transition metal salt that includes iron(III) cations, such as iron(III) halides (e.g., FeCl₃) or iron(III) salts of other inorganic acids, such as Fe(ClO₄)₃ or Fe₂(SO₄)₃ and the iron(III) salts of organic acids and inorganic acids comprising organic radicals. Examples of iron (III) salts of inorganic acids with organic radicals include, for instance, iron(III) salts of sulfuric acid monoesters of C₁ to C₂₀ alkanols (e.g., iron(III) salt of lauryl sulfate). Likewise, examples of iron(III) salts of organic acids include, for instance, iron(III) salts of C₁ to C₂₀ alkane sulfonic acids (e.g., methane, ethane, propane, butane, or dodecane sulfonic acid); iron (Ill) salts of aliphatic perfluorosulfonic acids (e.g., trifluoromethane sulfonic acid, perfluorobutane sulfonic acid, or perfluorooctane sulfonic acid); iron (III) salts of aliphatic C₁ to C₂₀ carboxylic acids (e.g., 2-ethylhexylcarboxylic acid); iron (III) salts of aliphatic perfluorocarboxylic acids (e.g., trifluoroacetic acid or perfluorooctane acid); iron (III) salts of aromatic sulfonic acids optionally substituted by C₁ to C₂₀ alkyl groups (e.g., benzene sulfonic acid, o-toluene sulfonic acid, p-toluene sulfonic acid, or dodecylbenzene sulfonic acid); iron (III) salts of cycloalkane sulfonic acids (e.g., camphor sulfonic acid); and so forth. Mixtures of these above-mentioned iron(III) salts may also be used. Iron(III)-p-toluene sulfonate, iron(III)-o-toluene sulfonate, and mixtures thereof, are particularly suitable. One commercially suitable example of iron(III)-p-toluene sulfonate is available from Heraeus Clevios under the designation Clevios™ C.

Various methods may be utilized to form a conductive polymer layer. In one embodiment, the oxidative catalyst and monomer are applied, either sequentially or together, such that the polymerization reaction occurs in situ on the anode part. Suitable application techniques that may include screen-printing, dipping, electrophoretic coating, and spraying may be used to form a conductive polymer coating. As an example, the monomer may initially be mixed with the oxidative catalyst to form a precursor solution. Once the mixture is formed, it may be applied to the anode part and then allowed to polymerize so that the conductive coating is formed on the surface. Alternatively, the oxidative catalyst and monomer may be applied sequentially. In one embodiment, for example, the oxidative catalyst is dissolved in an organic solvent (e.g., butanol) and then applied as a dipping solution. The anode part may then be dried to remove the solvent therefrom. Thereafter, the part may be dipped into a solution containing the monomer.

Polymerization may be typically performed at temperatures of from about −10° C. to about 250° C., and in some embodiments, from about 0° C. to about 200° C., depending on the oxidizing agent used and desired reaction time. Suitable polymerization techniques, such as described above, may be described in more detail in U.S. Pat. No. 7,515,396 to Biler. Still other methods for applying such conductive coating(s) may be described in U.S. Pat. No. 5,457,862 to Sakata, et al., U.S. Pat. No. 5,473,503 to Sakata, et al., U.S. Pat. No. 5,729,428 to Sakata, et al., and U.S. Pat. No. 5,812,367 to Kudoh, et al., which are incorporated herein in their entirety by reference thereto for all purposes.

In addition to in situ application, a conductive polymer layer may also be applied in the form of a dispersion of conductive polymer particles. Although the particle size may vary, it is typically desired that the particles possess a small diameter to increase the surface area available for adhering to the anode part. For example, the particles may have an average diameter of from about 1 nanometer to about 500 nanometers, in some embodiments from about 5 nanometers to about 400 nanometers, and in some embodiments, from about 10 nanometers to about 300 nanometers. The D₉₀ value of the particles (particles having a diameter of less than or equal to the D₉₀ value constitute 90% of the total volume of all of the solid particles) may be about 15 micrometers or less, in some embodiments about 10 micrometers or less, and in some embodiments, from about 1 nanometer to about 8 micrometers. The diameter of the particles may be determined using known techniques, such as by ultracentrifuge, laser diffraction, etc.

The formation of the conductive polymer into a particulate form may be enhanced by using a separate counterion to counteract the positive charge carried by the substituted polythiophene. In some cases, the polymer may possess positive and negative charges in the structural unit, with the positive charge being located on the main chain and the negative charge optionally on the substituents of the radical "R", such as sulfonate or carboxylate groups. The positive charges of the main chain may be partially or wholly saturated with the optionally present anionic groups on the radicals "R." Viewed overall, the polythiophenes may, in these cases, be cationic, neutral or even anionic. Nevertheless, they are all regarded as cationic polythiophenes as the polythiophene main chain has a positive charge.

The counterion may be a monomeric or polymeric anion. Polymeric anions can, for example, be anions of polymeric carboxylic acids (e.g., polyacrylic acids, polymethacrylic acid, polymaleic acids, etc.); polymeric sulfonic acids (e.g., polystyrene sulfonic acids ("PSS"), polyvinyl sulfonic acids, etc.); and so forth. The acids may also be copolymers, such as copolymers of vinyl carboxylic and vinyl sulfonic acids with other polymerizable monomers, such as acrylic acid esters and styrene. Likewise, suitable monomeric anions include, for example, anions of $C_1$ to $C_{20}$ alkane sulfonic acids (e.g., dodecane sulfonic acid); aliphatic perfluorosulfonic acids (e.g., trifluoromethane sulfonic acid, perfluorobutane sulfonic acid or perfluorooctane sulfonic acid); aliphatic $C_1$ to $C_{20}$ carboxylic acids (e.g., 2-ethyl-hexylcarboxylic acid); aliphatic perfluorocarboxylic acids (e.g., trifluoroacetic acid or perfluorooctanoic acid); aromatic sulfonic acids optionally substituted by $C_1$ to $C_{20}$ alkyl groups (e.g., benzene sulfonic acid, o-toluene sulfonic acid, p-toluene sulfonic acid or dodecylbenzene sulfonic acid); cycloalkane sulfonic acids (e.g., camphor sulfonic acid or tetrafluoroborates, hexafluorophosphates, perchlorates, hexafluoroantimonates, hexafluoroarsenates or hexachloroantimonates); and so forth. Particularly suitable counteranions are polymeric anions, such as a polymeric carboxylic or sulfonic acid (e.g., polystyrene sulfonic acid ("PSS")). The molecular weight of such polymeric anions typically ranges from about 1,000 to about 2,000,000, and in some embodiments, from about 2,000 to about 500,000.

When employed, the weight ratio of such counterions to substituted polythiophenes in a given layer is typically from about 0.5:1 to about 50:1, in some embodiments from about 1:1 to about 30:1, and in some embodiments, from about 2:1 to about 20:1. The weight of the substituted polythiophene referred to in the above-referenced weight ratios refers to the weighed-in portion of the monomers used, assuming that a complete conversion occurs during polymerization.

The dispersion may also contain one or more binders to further enhance the adhesive nature of the polymeric layer and also increase the stability of the particles within the dispersion. The binders may be organic in nature, such as polyvinyl alcohols, polyvinyl pyrrolidones, polyvinyl chlorides, polyvinyl acetates, polyvinyl butyrates, polyacrylic acid esters, polyacrylic acid amides, polymethacrylic acid esters, polymethacrylic acid amides, polyacrylonitriles, styrene/acrylic acid ester, vinyl acetate/acrylic acid ester and ethylene/vinyl acetate copolymers, polybutadienes, polyisoprenes, polystyrenes, polyethers, polyesters, polycarbonates, polyurethanes, polyamides, polyimides, polysulfones, melamine formaldehyde resins, epoxide resins, silicone resins or celluloses. Crosslinking agents may also be employed to enhance the adhesion capacity of the binders. Such crosslinking agents may include, for instance, melamine compounds, masked isocyanates or functional silanes, such as 3-glycidoxypropyltrialkoxysilane, tetraethoxysilane and tetraethoxysilane hydrolysate or crosslinkable polymers, such as polyurethanes, polyacrylates or polyolefins. Other components may also be included within the dispersion as is known in the art, such as dispersion agents (e.g., water), surface-active substances, etc.

If desired, one or more of the above-described application steps may be repeated until the desired thickness of the coating is achieved. In some embodiments, only a relatively thin layer of the coating is formed at a time. The total target thickness of the coating may generally vary depending on the desired properties of the capacitor. Typically, the resulting conductive polymer coating has a thickness of from about 0.2 micrometers to about 50 micrometers, in some embodiments from about 0.5 micrometers to about 20 micrometers, and in some embodiments, from about 1 micrometer to about 5 micrometers. It should be understood that the thickness of the coating is not necessarily the same at all locations on the anode part. Nevertheless, the average thickness of the coating on the substrate generally falls within the ranges noted above.

The conductive polymer layer may optionally be healed. Healing may occur after each application of a conductive polymer layer or may occur after the application of the entire coating. In some embodiments, the conductive polymer can be healed by dipping the part into an electrolyte solution, and thereafter applying a constant voltage to the solution until the current is reduced to a preselected level. If desired, such healing can be accomplished in multiple steps. For example, an electrolyte solution can be a dilute solution of the monomer, the catalyst, and dopant in an alcohol solvent (e.g., ethanol). The coating may also be washed if desired to remove various byproducts, excess reagents, and so forth.

D. Additional Layers

Although not required, an external polymer coating may also be applied to the anode body and overlie the solid electrolyte. The external polymer coating generally contains one or more layers formed from a dispersion of pre-polymerized conductive particles, such as described in more detail above. The external coating may be able to further penetrate into the edge region of the capacitor body to increase the adhesion to the dielectric and result in a more mechanically robust part, which may reduce equivalent series resistance and leakage current. Because it is generally intended to improve the degree of edge coverage rather to impregnate the interior of the anode body, the particles used in the external coating typically have a larger size than those employed in any optional dispersions of the solid electrolyte. For example, the ratio of the average size of the particles employed in the external polymer coating to the average size of the particles employed in any dispersion of the solid electrolyte is typically from about 1.5 to about 30, in some embodiments from about 2 to about 20, and in some embodiments, from about 5 to about 15. For example, the particles employed in the dispersion of the external coating may have an average size of from about 50 nanometers to about 500 nanometers, in some embodiments from about 80 nanometers to about 250 nanometers, and in some embodiments, from about 100 nanometers to about 200 nanometers.

If desired, a crosslinking agent may also be employed in the external polymer coating to enhance the degree of adhesion to the solid electrolyte. Typically, the crosslinking agent is applied prior to application of the dispersion used in the external coating. Suitable crosslinking agents are described, for instance, in U.S. Patent Publication No. 2007/0064376 to Merker, et al. and include, for instance, amines (e.g., diamines, triamines, oligomer amines, polyamines, etc.); polyvalent metal cations, such as salts or compounds of Mg, Al, Ca, Fe, Cr, Mn, Ba, Ti, Co, Ni, Cu, Ru, Ce or Zn, phosphonium compounds, sulfonium compounds, etc. Particularly suitable examples include, for instance, 1,4-diaminocyclohexane, 1,4-bis(amino-methyl) cyclohexane, ethylenediamine, 1,6-hexanediamine, 1,7-heptanediamine, 1,8-octanediamine, 1,9-nonanediamine, 1,10-decanediamine, 1,12-dodecanediamine, N,N-dimethylethylenediamine, N,N,N',N'-tetramethylethylenediamine, N,N,N',N'-tetramethyl-1,4-butanediamine, etc., as well as mixtures thereof.

The crosslinking agent may be typically applied from a solution or dispersion whose pH is from 1 to 10, in some embodiments from 2 to 7, in some embodiments, from 3 to 6, as determined at 25° C. Acidic compounds may be employed to help achieve the desired pH level. Examples of solvents or dispersants for the crosslinking agent include water or organic solvents, such as alcohols, ketones, carboxylic esters, etc. The crosslinking agent may be applied to the capacitor body by any known process, such as spin-coating, impregnation, casting, dropwise application, spray application, vapor deposition, sputtering, sublimation, knife-coating, painting or printing, for example inkjet, screen or pad printing. Once applied, the crosslinking agent may be dried prior to application of the polymer dispersion. This process may then be repeated until the desired thickness is achieved. For example, the total thickness of the entire external polymer coating, including the crosslinking agent and dispersion layers, may range from about 1 micrometer to about 50 micrometers, in some embodiments from about 2 micrometers to about 40 micrometers, and in some embodiments, from about 5 micrometers to about 20 micrometers.

If desired, the capacitor may also contain other layers. For example, a protective coating may optionally be formed between the dielectric and solid electrolyte, such as one made of a relatively insulative resinous material (natural or synthetic). Such materials may have a specific resistivity of greater than about 10 Ω·cm, in some embodiments greater than about 100, in some embodiments greater than about 1,000 Ω·cm, in some embodiments greater than about $1\times10^5$ Ω·cm, and in some embodiments, greater than about $1\times10^{10}$ Ω·cm. Some resinous materials that may be utilized in the present invention include, but are not limited to, polyurethane, polystyrene, esters of unsaturated or saturated fatty acids (e.g., glycerides), and so forth. For instance, suitable esters of fatty acids include, but are not limited to, esters of lauric acid, myristic acid, palmitic acid, stearic acid, eleostearic acid, oleic acid, linoleic acid, linolenic acid, aleuritic acid, shellolic acid, and so forth. These esters of fatty acids have been found particularly useful when used in relatively complex combinations to form a "drying oil", which allows the resulting film to rapidly polymerize into a stable layer. Such drying oils may include mono-, di-, and/or tri-glycerides, which have a glycerol backbone with one, two, and three, respectively, fatty acyl residues that are esterified. For instance, some suitable drying oils that may be used include, but are not limited to, olive oil, linseed oil, castor oil, tung oil, soybean oil, and shellac. These and other protective coating materials are described in more detail U.S. Pat. No. 6,674,635 to Fife, et al., which is incorporated herein in its entirety by reference thereto for all purposes.

If desired, the part may also be applied with a carbon layer (e.g., graphite) and silver layer, respectively. The silver coating may, for instance, act as a solderable conductor, contact layer, and/or charge collector for the capacitor and the carbon coating may limit contact of the silver coating with the solid electrolyte. Such coatings may cover some or all of the solid electrolyte.

II. Anode Lead Assembly

As discussed above, the electrolytic capacitor of the present invention includes a first anode lead and a second anode lead that form an anode lead assembly. The first anode lead can have an embedded portion that is embedded within the porous anode body and an external portion that extends from a surface thereof in a longitudinal direction. Meanwhile, the second anode lead is not embedded within the porous anode body and can have a first portion that is in contact with the external portion of the first anode lead and a second portion that is in contact with an anode termination of a leadframe. The first and second anode leads may be formed from any electrically conductive material, such as tantalum, niobium, nickel, aluminum, hafnium, titanium, stainless steel, etc., as well as alloys, oxides, and/or nitrides of thereof. For instance, in some embodiments, the first anode lead can be tantalum and the second anode lead can be a stainless steel, nickel, or a nickel alloy, which can help reduce the cost of the anode lead assembly. In one particular embodiment, the second anode lead can be formed of NILO®, which is a nickel-iron alloy. Although in some embodiments the first anode lead is formed from tantalum and the second anode lead can be formed from a non-tantalum material, it should be understood that it is also possible for the first and second anode leads can be formed from the same material (e.g., tantalum) in other embodiments.

In addition, the first and second anode leads may possess any desired cross-sectional shape, such as circular, elliptical, square, rectangular, triangular, trapezoidal, standard oval, racetrack oval, etc., or a combination thereof. For example, the embedded portion and a first external portion of the first anode lead and the first portion of the second anode leads can be circular, while a second external portion of the first anode lead can be a trapezoid shape and the first portion of the second anode lead can be a standard oval or racetrack oval shape, for example, where the difference in shape is due to flattening, crimping, compressing, or otherwise altering the shape of the second external portion of the first anode lead to create a substantially planar surface and the first portion of the second anode lead to create a substantially planar surface, where the two substantially planar surfaces are connected together as discussed in more detail below. Further, it is to be understood that any of the portions of the first and second anode leads can have any one of the aforementioned shapes or any other suitable shape. For instance, the entire external portion of the first anode lead can be flattened, crimped, compressed, or otherwise altered such that the entire external portion of the first anode lead includes a substantially planar surface.

Moreover, as a result of the formation of a substantially planar surface on the external portion of the first anode lead, the embedded portion and, in some embodiments, the first external portion of the first anode lead, can have a larger thickness/height or diameter than the second portion of the second anode lead to improve the bonding between the embedded portion of the first anode lead and the particles of the anode body, which can result in a lower ESR, while the second portion of the second anode lead can have a smaller thickness/height or diameter than the embedded portion and, in some embodiments, the first external portion of the first anode lead, to reduce the internal resistance of the overall anode lead assembly, which can also result in a lower ESR. Thus, the combination of the larger diameter first anode lead and the smaller diameter second anode lead can synergistically reduce the ESR of the capacitor. For instance, because the embedded portion of the first anode lead can have a larger thickness/height or diameter to increase the points of contact between the first anode lead and the anode body, the resistance at the points of contact is reduced. In addition, in some embodiments, while the first external portion of the first anode lead can have the same larger thickness/height or diameter as the embedded portion of the first anode lead, the first external portion can extend only a small distance from a surface of the anode body to minimize the length of the first external portion of the first anode lead having a larger diameter, which, in turn, can minimize the effect of the increased internal resistance in the lead due to its larger diameter. Further, in other embodiments, the entire external portion of the first anode lead can have a reduced diameter compared to the embedded portion of the first anode lead to minimize the effect of the increased internal resistance in the lead due to its larger diameter. Meanwhile, the second portion of the second anode lead, which can be used to form an electrical connection with an anode termination, can have a smaller diameter than that of the embedded portion of the first anode lead, which can reduce the internal resistance of the second portion of the second anode lead to minimize the ESR of the anode lead assembly extending from/external to the porous anode body.

As described above and shown in FIGS. 1-8, in some embodiments, such as when the first anode lead includes tantalum and the second anode lead includes a non-tantalum material, the anode lead assembly 50 includes a first anode lead 59 that generally has a larger thickness/height or diameter than the second anode lead 70. For example, referring to FIGS. 6-7, the embedded portion 60 and the first external portion 61 of the first anode lead 59 can have a thickness/height or diameter H1 of from about 100 micrometers to about 2000 micrometers, such as from about 200 micrometers to about 1500 micrometers, such as from about 250 micrometers to about 1000 micrometers. It should be understood, however, that although FIGS. 1-8 show a first anode lead 59 having a first external portion 61 and a second external portion 62, where only the second external portion 62 has a reduced height/thickness compared to the embedded portion 60 of the first anode lead 59, in some embodiments, the entire external portion of the first anode lead 59 can have a reduced height/thickness compared to the embedded portion 60 of the first anode lead 59.

Meanwhile, the second portion 72 of the second anode lead 70 can have a height/thickness or diameter H4 of from about 10 micrometers to about 1800 micrometers, such as from about 50 micrometers to about 1200 micrometers, such as from about 100 micrometers to about 750 micrometers. Further, the second portion 72 of the second anode lead 70 can have a height/thickness or diameter H4 that is from about 10% to about 90% of the height/thickness or diameter H1 of the embedded portion 60 of the first anode led 59, such as from about 15% to about 85% of the height/thickness or diameter of the embedded portion 60 of the first anode lead 59, such as from about 20% to about 80% of the height/thickness or diameter of the embedded portion 60 of the first anode lead 59, such as from about 25% to about 75% of the height/thickness or diameter of the embedded portion 60 of the first anode lead 59. The reduced height/thickness or diameter H4 of the second portion 72 of the second anode lead 70 compared to the height/thickness or diameter H1 of the embedded portion 60 of the first anode lead 59 can lead to a reduced ESR and can also reduce the amount of energy required to connect the anode lead assembly 50 to an anode termination 35.

Figure 6:
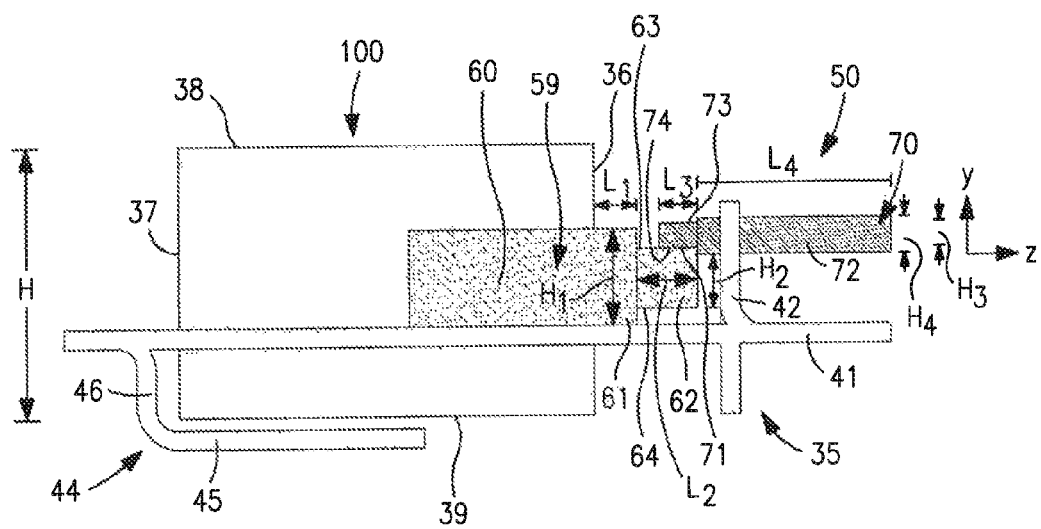
FIG. 6 is a side view of the electrolytic capacitor of FIGS. 1 through 5.
Figure 7:
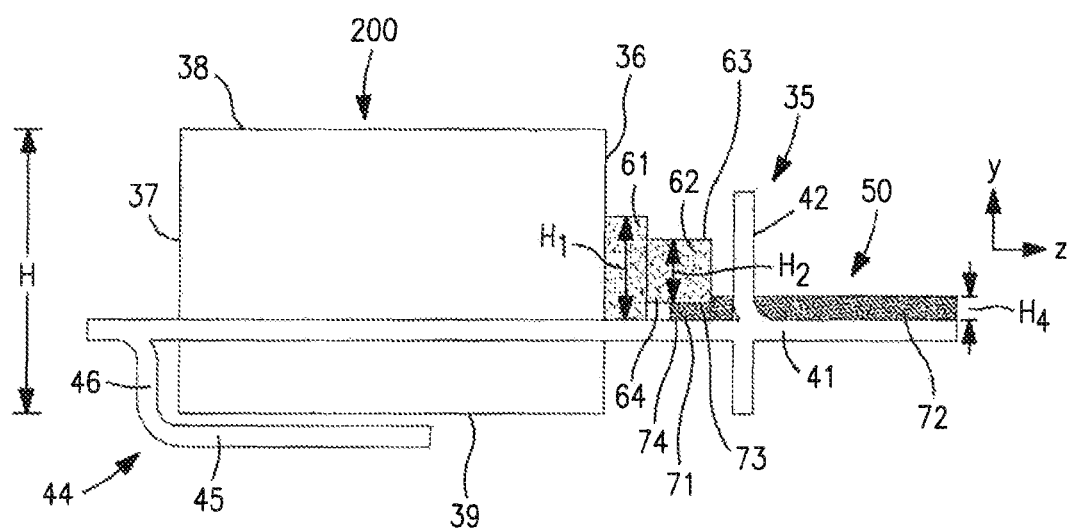
FIG. 7 is a side view of another electrolytic capacitor of the present invention.
Figure 8:
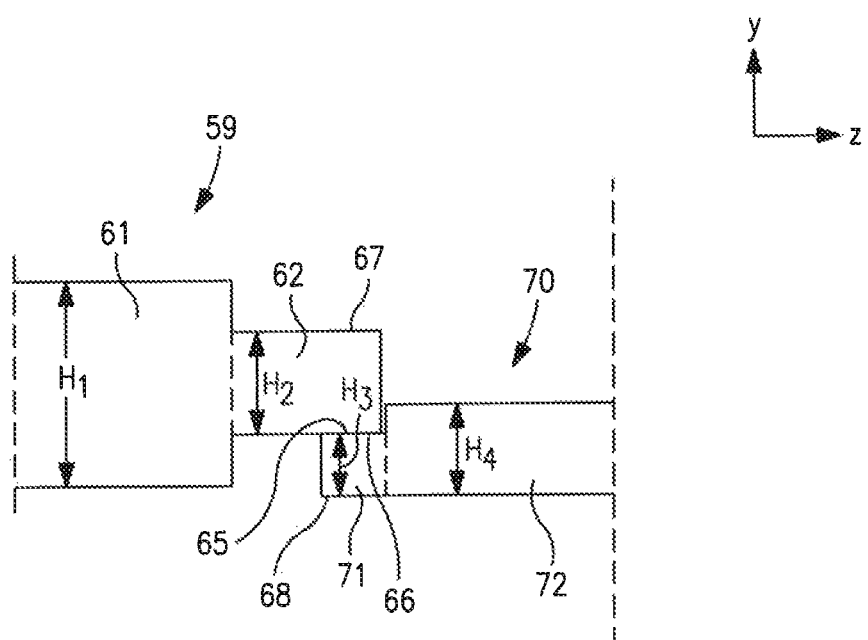
FIG. 8 is a side view of one embodiment of an anode lead assembly of the present invention.

Moreover, as shown in FIGS. 6-7, in some embodiments, the second external portion 62 of the first anode lead 59 can have a thickness/height H2 that is the smaller than the thickness/height or diameter H1 of the embedded portion 60 and the first external portion 61 of the first anode lead 59, although it is to be understood that in alternative embodiments, the entire external portion of the first anode lead 59 can have a thickness/height H2 that is smaller than the thickness/height or diameter H1 of the embedded portion 60 of the first anode lead 59. For instance, the thickness/height H2 of the second external portion 62 of the first anode lead 59 can range from about 5% to about 99.9%, such as from about 10% to about 90%, such as from about 20% to about 80% of the thickness/height or diameter H1 of the embedded portion 60 and the first external portion 61 of the first anode lead 59. Meanwhile, the first portion 71 of the second anode lead 70 can have a height/thickness H3 that is smaller than the thickness/height or diameter H4 of the second portion 72 of the second anode lead 70. For instance, the height/thickness H3 of the first portion 71 of the second anode lead 70 can range from about 5% to about 99.9%, such as from about 10% to about 90%, such as from about 20% to about 80% of thickness/height or diameter H4 of the second portion 72 of the second anode lead 70. The smaller heights of the second external portion 62 of the first anode lead 59 compared to the first external portion 61 of the first anode lead 59 and the first portion 71 of the second anode lead 70 compared to the second portion 72 of the second anode lead 70 can be due to flattening, crimping, compressing, or otherwise altering the geometry of such portions of the first and second anode leads to create substantially planar surfaces thereon, which facilitates a more effective connection between the second external portion 62 of the first anode lead 59 and the first portion 71 of the second anode lead 70 that requires less energy during, for example, resistance welding. For example, as shown in FIG. 8, the external portion of the first anode lead 59 can include a lower substantially planar surface 65 and an upper substantially planar surface 67 formed by flattening, crimping, compressing, or otherwise altering the geometry of the first anode lead 59. In FIG. 8, the substantially planar surfaces 65 and 67 are shown as being formed on just a second external portion 62 of the first anode lead 59, but it should be understood that such substantially planar surfaces can be formed on the entire external portion of the first anode lead 59 in other embodiments. As also shown in FIG. 8, the first portion 71 of the second anode lead 70 can include an upper substantially planar surface 66 and a lower substantially planar surface 68 formed by flattening, crimping, compressing, or otherwise altering the geometry of the second anode lead 70. In FIG. 8, the lower substantially planar surface 65 of the second external portion 62 of the first anode lead 59 is connected to the upper substantially planar surface 66 of the first portion 71 of the second anode lead 70, although it should be understood that in alternative embodiments, the upper substantially planar surface 67 of the second external portion 62 of the first anode lead 59 can be connected to the lower substantially planar surface 68 of the first portion 71 of the second anode lead 70.

Figure 3:
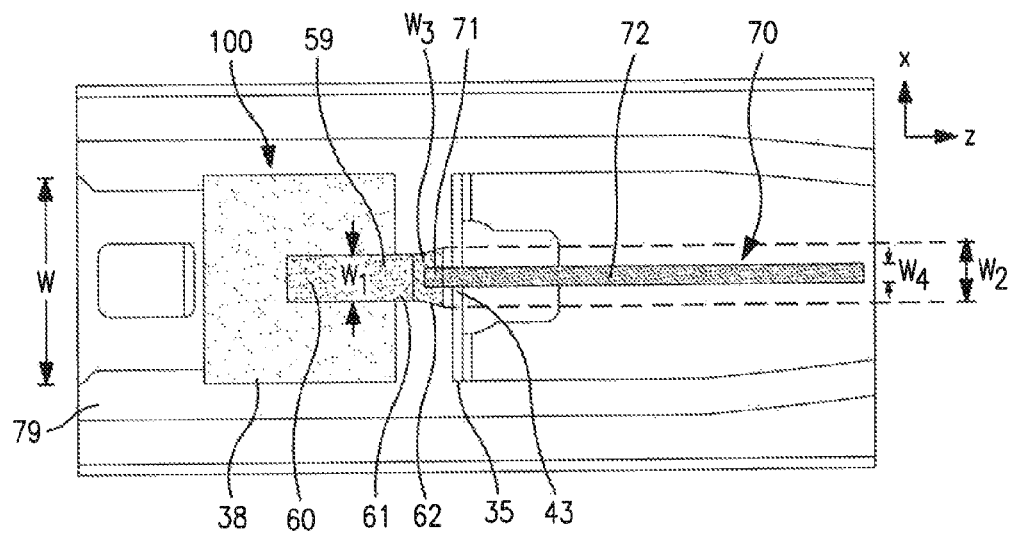
FIG. 3 is a top view of the electrolytic capacitor of FIGS. 1 and 2.
Figure 4:
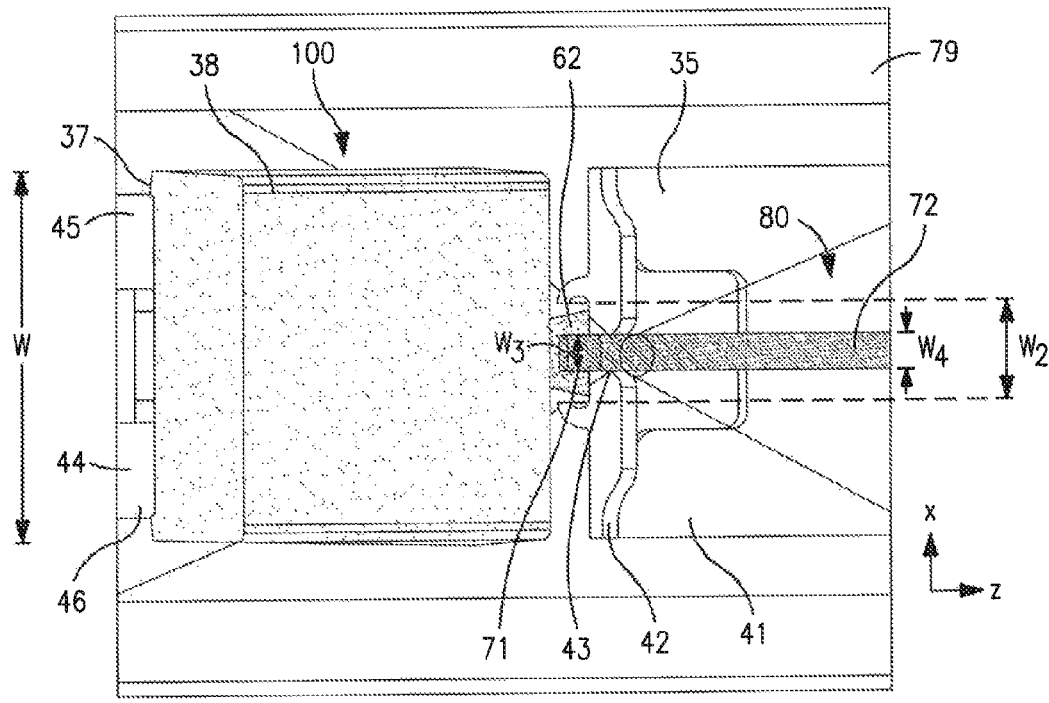
FIG. 4 is another top view of the electrolytic capacitor of FIGS. 1 and 2 as the anode lead assembly is being welded to the anode termination.
Figure 5:
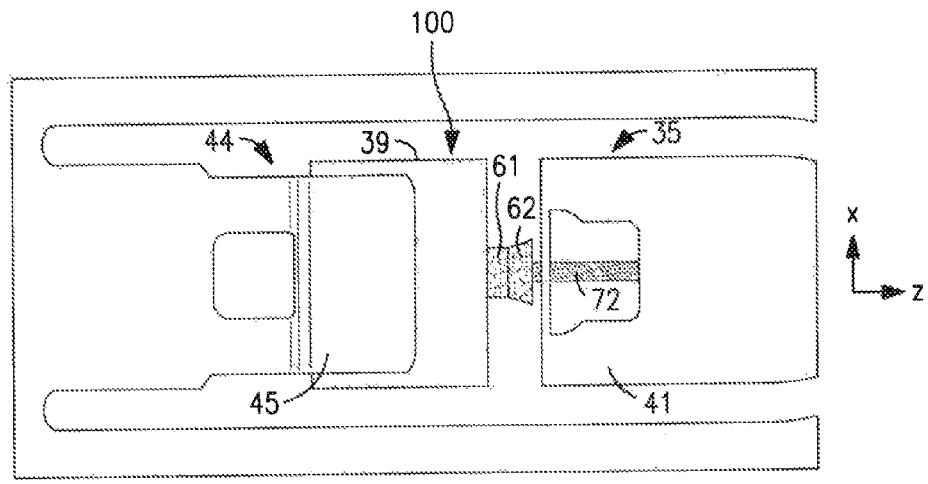
FIG. 5 is a bottom view of the electrolytic capacitor of FIGS. 1 through 4.

Meanwhile, as shown in FIGS. 3-4, the embedded portion 60 and, in some embodiments, the first external portion 61 of the first anode lead 59, can have a width W1 of from about 100 micrometers to about 2000 micrometers, such as from about 200 micrometers to about 1500 micrometers, such as from about 250 micrometers to about 1000 micrometers. Meanwhile, the second portion 72 of the second anode lead 70 can have a width W4 of from about 10 micrometers to about 1800 micrometers, such as from about 50 micrometers to about 1200 micrometers, such as from about 100 micrometers to about 750 micrometers. Further, the second portion 72 of the second anode lead 70 can have a width W4 that is from about 10% to about 90% of the width W1 of the embedded portion 60 of the first anode led 59, such as from about 15% to about 85% of the width W1 of the embedded portion 60 of the first anode lead 59, such as from about 20% to about 80% of the height/thickness or diameter of the embedded portion 60 of the first anode lead 59, such as from about 25% to about 75% of the height/thickness or diameter of the embedded portion 60 of the first anode lead 59. The reduced width W4 of the second portion 72 of the second anode lead 70 compared to the width W1 embedded portion 60 of the first anode lead 59 can lead to a reduced ESR and can also reduce the amount of energy required to connect the anode lead assembly 50 to an anode termination 35.

Moreover, referring to FIGS. 3-4 and as discussed above, when the first anode lead 59 and the second anode lead 70 are flattened, crimped, compressed or otherwise altered to form the aforementioned substantially planar surfaces thereon for improved resistance welding of the two leads, the second external portion 62 of the first anode lead 59 and the first portion 71 of the second anode lead 70 can have a reduced heights/thickness compared to the embedded portion 60 and first external portion 61 of the first anode lead 59 and the second portion 72 of the second anode lead 70, respectively. As a result, the width W2 of the second external portion 62 of the first anode lead 59 and the width W3 of the first portion 71 of the second anode lead 70 can have about the same width W1 as the first external portion 61 of the first anode lead 59 and the width W4 of the second portion 72 of the second anode lead 70, respectively, or the widths W2 and W3 can be increased, depending on the amount of flattening, crimping, compression, etc.

For instance, as shown in FIG. 3, the width W2 of the second external portion 62 of the first anode lead 59 can vary along the z-direction such that the second external portion 62 has a trapezoid shape, where the end of the second external portion 62 adjacent the first external portion 61 of the first anode lead 59 can have the same width as the first external portion 61, while the end of the second external portion 62 closer to the anode termination 35 can have an increased width compared to that of the first external portion 61 due to the flattening of the second external portion 62, and the first external portion 61 can have a circular shape. In some embodiments, the width W2 of the second external portion 62 of the first anode lead 59 can be from about 100% to about 250%, such as from about 110% to about 225%, such as from about 120% to about 200% of the width W1 of the first external portion 61 of the first anode lead 59. Further, as shown in FIG. 3 and as discussed above, it is to be understood that the width W2 of the second external portion 62 can vary in the longitudinal direction along the z-axis such that the width W2 can be from about 100% to about 250% of the width W1 of the first external portion 61 of the first anode lead 59 depending on the location along the second external portion 62 at which the width W2 is determined. Further, it should be understood that the aforementioned varying width can occur along the entire external portion of the first anode lead 59 rather than at just the second external portion 62 when the entire external portion and not just the second external portion 62 of the first anode lead 59 is flattened, crimped, compressed, etc. to create a substantially planar surface thereon.

Meanwhile, as shown in FIG. 4, the width W3 of the first portion 71 of the second anode lead 70 can be generally constant along the z-direction and can be larger than the width W4 of the second portion 72 of the second anode lead 70 due to flattening, crimping, compression, etc. of the first portion 71. However, it should also be understood that the first portion 71 and the second portion 72 of the second anode lead 70 can have about the same width. In some embodiments, the width W3 of the first portion 71 of the second anode lead 70 can be from about 100% to about 200%, such as from about 105% to about 175%, such as from about 110% to about 150% of the width W4 of the second portion 72 of the second anode lead 70. Further, as shown in FIG. 4, in some embodiments, the first portion 71 of the second anode lead 70 can have a racetrack oval or standard oval shape due to formation of a substantially planar surface at the first portion 71, while the second portion 72 of the second anode lead 70 can be circular.

Moreover, as shown in FIG. 6, in some embodiments where the external portion of the first anode lead 59 includes a first external portion 61 and a second external portion 62, the first external portion 61 of the first anode lead 59 (i.e., the portion of the first anode lead that extends from a surface of the porous anode body in the longitudinal or z-axis direction) can have a length L1 in the longitudinal or z-axis direction that is shorter than the length L2 of the second (e.g., flattened) external portion 62 of the first anode lead 59 in the longitudinal or z-axis direction. The length L1 of the first external portion 61 of the first anode lead 59 is minimized to reduce the ESR of the capacitor that can be attributed to the increased internal resistance of the first external portion 61 of the first anode lead 59 due to its larger height/thickness or diameter compared to the second anode lead 70 and to enhance the stability of the lead assembly 50 by reducing the risk of bending due to the weight of the first anode lead 59. Thus, in some embodiments, the length L2 of the second external portion 62 of the first anode lead 59 can be from about 100% to about 250%, such as from about 110% to about 225%, such as from about 120% to about 200% of the length L1 of the first external portion 61 of the first anode lead 59.

Meanwhile, as also shown in FIG. 6, the first portion 71 of the second anode lead 70 can have a length L3 and the second portion 72 of the second anode lead 70 can have a length L4. Generally, prior to trimming of the second portion 72 (discussed in more detail below), the length L4 is larger than the length L3. Thus, in some embodiments and prior to any trimming, the length L4 of the second portion 72 of the second anode lead 70 can be from about 100% to about 1000%, such as from about 125% to about 900%, such as from about 150% to about 800% of the length L3 of the first portion 71 of the second anode lead 70. However, it is to be understood that upon welding of the second portion 72 of the second anode lead 70 to the anode termination 35 and trimming the excess anode lead material, the length L4 may be smaller than, the same as, or larger than the length L4 depending on the particular configuration of the capacitor. In any event, as shown in FIG. 6, the length L3 of the first portion 71 of the second anode lead 70 can be equal to or smaller than the length L2 of the second external portion 62 of the first anode lead 60 to facilitate welding (e.g., resistance welding) of the first portion 71 of the second anode lead 70 to the second external portion 62 of the first anode lead 59.

Moreover, the total length L1+L2 of the first and second external portions 61 and 62 of the first anode lead 59 can range from about 1 micrometer to about 10 millimeters, such as from about 5 micrometers to about 7.5 millimeters, such as from about 10 micrometers to about 5 millimeters. Meanwhile, the total length L3+L4 of the first and second portions 71 and 72 of the second anode lead 72 prior to trimming can have a length of from about 1 micrometer to about 20 millimeters, such as from about 100 micrometers to about 15 millimeters, such as from about 1000 micrometers to about 10 millimeters. Further, after trimming, the total length L3+L4 can vary based on the particular design of the capacitor and the location of the anode termination 35 as the second portion 72 of the second anode lead 70 must extend at least to the anode termination 35 for welding thereto.

In addition, it should be understood that the anode lead assembly 50 can have various configurations depending on where the second anode lead 70 is connected to the first anode lead 59. For example, in FIG. 6, an upper surface 63 of the second external portion 62 of the first anode lead 59 is in contact with a lower surface 74 of the first portion 71 second anode lead 70. On the other hand, in another embodiment, in FIG. 7, a lower surface 64 of the second external portion 62 of the first anode lead 59 is in contact with an upper surface 73 of the first portion 71 of the second anode lead 70. However, it is also to be understood that in other embodiments, any surface of second external portion 62 of the first anode lead 59 can be connected to any surface of the first portion 71 of the second anode lead 70. In an event, the second anode lead 70 can extend from the second portion 62 of the first anode lead 59 in a longitudinal or z-axis direction as shown in FIGS. 1-7. Further, the first portion 71 of the second anode 70 lead can be connected to second external portion 62 of the first anode lead 59 by any suitable method such as by resistance welding, laser welding, or a conductive adhesive. Referring to FIG. 8, in one particular embodiment, for instance, the leads are connected by resistance welding a substantially planar surface 66 of the first portion 71 of the second anode lead 70 to a substantially planar surface 65 of the external portion of the first anode lead 59, where the substantially planar surface 65 of the external portion of the first anode lead 59 does not extend the entire length of the external portion of the first anode lead 59, although it can in some embodiments.

Figure 9:
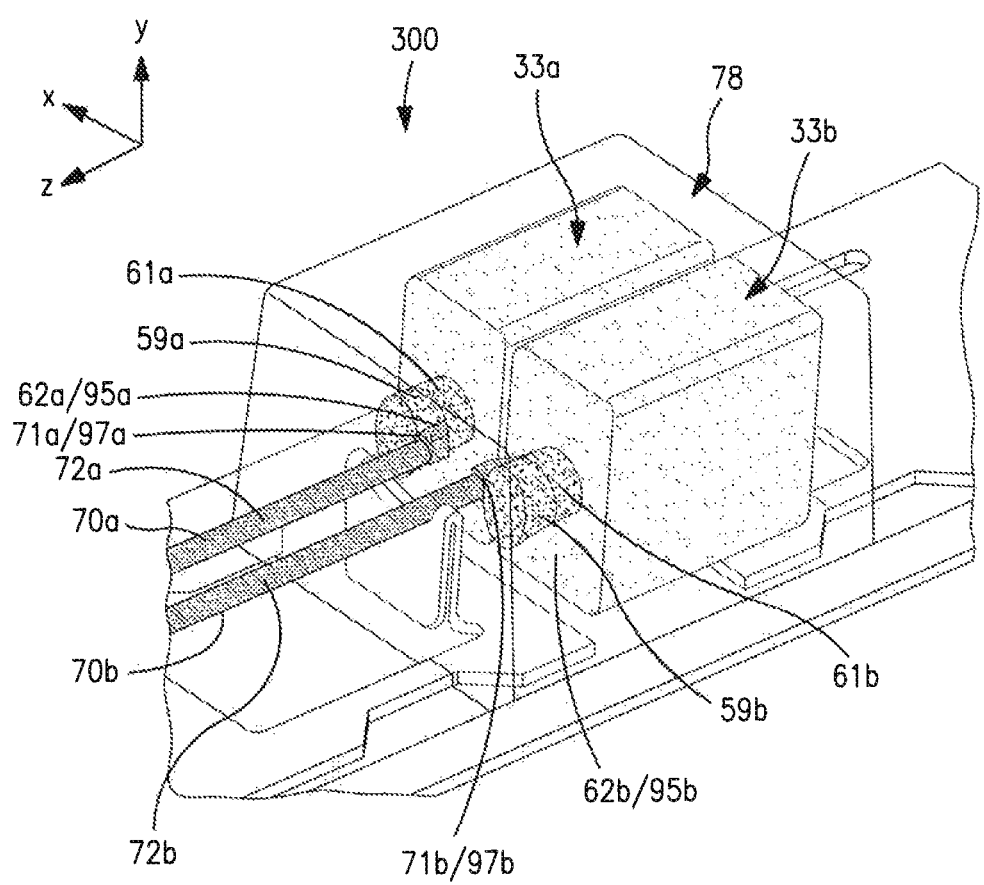
FIG. 9 is a perspective view of another embodiment of a solid electrolytic capacitor of the present invention, where the capacitor includes two capacitor elements and two anode lead assemblies.

In still another embodiment, the capacitor of the present invention can include more than one anode body, such as two, three, four, five, or six anode bodies. For instance, as shown in FIG. 9, a capacitor 300 can include a first porous anode body 33a and a second porous anode body 33b disposed within an encapsulant 78. The first porous anode body 33a includes a first anode lead 59a including a first external portion 61a and a second external portion 62a; and a second anode lead 70a including a first portion 71a and a second portion 72a, and the second porous anode body 33b includes a first anode lead 59b including a first external portion 61b and a second external portion 62b; and a second anode lead 70b including a first portion 71b and a second portion 72b. The second external portions 62a and 62b of the first anode leads 59a and 59b, respectively, including substantially planar side surfaces 95a and 95b, while the first portions 71a and 71b of the second anode leads 70a and 70b, respectively, include substantially planar side surfaces 97a and 97b, where the substantially planar side surfaces 97a and 97b of the first portions 71a and 71b of the second anode leads 70a and 70b are connected, such as by side resistance welding, to the substantially planar side surfaces 95a and 95b of the second external portions 62a and 62b of the first anode leads 59a and 59b. However, it is to be understood that the second external portions 62a and 62b of the first anode leads 59a and 59b and the first portions 71a and 71b of the second anode leads 70a and 70b can be connected at planar surfaces located at any position on each of the anode leads, such as at substantially planar upper or lower surfaces, as discussed above in reference to FIGS. 1-7. Further, it is also to be understood that although the substantially planar side surfaces 95a and 95b of the external portion of the first anode leads 59a and 59b do not extend the entire length of the external portion of the first anode leads 59a and 59b in FIG. 9, in some embodiments, the substantially planar side surfaces 95a and 95b of the external portion of the first anode leads 59a and 59b can extend the entire length of the external portion of the first anode leads 59a and 59b.

Regardless of the particular design or manner in which the capacitor 100 or 200 is formed, it can be connected to terminations as is well known in the art. For example, anode and cathode terminations may be electrically connected to the second anode lead and the cathode, respectively. The specific configuration of the terminations may vary as is well known in the art. Although not required, as shown in FIGS. 1-7, for example, the cathode termination 44 can contain a planar portion 45 in electrical contact with a lower surface 39 of the capacitor element and an upstanding portion 46 positioned substantially perpendicular to the planar portion 45 and in electrical contact with a rear surface 37 of the capacitor element in the capacitor 100 of FIGS. 1-6 or the capacitor 200 of FIG. 7. To attach the capacitor to the cathode termination, a conductive adhesive may be employed as is known in the art. The conductive adhesive may include, for instance, conductive metal particles contained with a resin composition. The metal particles may be silver, copper, gold, platinum, nickel, zinc, bismuth, etc. The resin composition may include a thermoset resin (e.g., epoxy resin), curing agent (e.g., acid anhydride), and coupling agent (e.g., silane coupling agents). Suitable conductive adhesives are described in U.S. Patent Application Publication No. 2006/0038304 to Osako. et al., which is incorporated herein in its entirety by reference thereto for all purposes.

Figure 2:
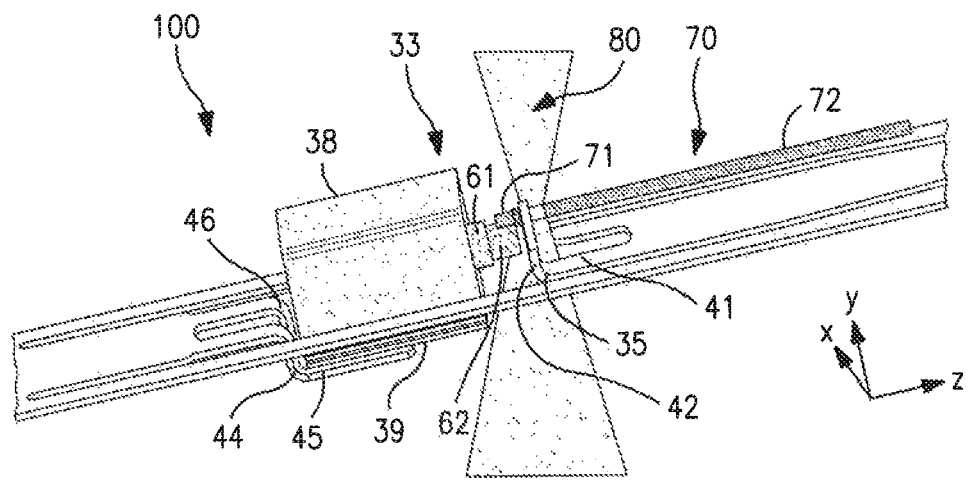
FIG. 2 is a perspective side view of one embodiment of an electrolytic capacitor of the present invention.

Referring again to FIGS. 1-7, although not required, the anode termination 35 may likewise contain a planar portion 41 and an upstanding portion 42. The upstanding portion 42 may contain a region that carries the second portion 72 of the second anode lead 70 of the present invention. For example, the region may possess a slot 43 for receiving the second portion 72 of the second anode lead 72. The slot may have any desired shape, and can be U-shaped, V-shaped, circular, elliptical, oval, rectangular, square, stepped, etc. for further enhancing surface contact and mechanical stability of the second portion 72 of the second anode lead 70 at the anode termination 35. For instance, the geometry of the slot 43 may match the geometry of the second portion 72 of the second anode lead 70. The second portion 72 of the second anode lead 70 can be electrically connected to the anode termination 35 by any suitable technique, such as by laser welding, by resistance welding, or the use of conductive adhesives, etc. As shown in FIGS. 2 and 4, in one particular embodiment, a laser beam 80 can be used to laser weld the second portion 72 of the second anode lead 70 to the anode termination 35 at slot 43. Regardless of the particular welding technique used to connect the second portion 72 of the second anode lead 70 to the anode termination 35, the amount of energy required to form a sufficient weld is reduced when compared to the amount of energy that would be required if the larger thickness/height or diameter first external portion 61 of the first anode lead 59 was directly connected to the anode termination 35. Thus, by utilizing a smaller second anode lead 70 to serve as the direct connection to the anode termination 35, the benefit of embedding a relatively thick embedded portion 60 of the first anode lead 59 in the porous anode body 33 can still be realized (i.e., improved contact with the porous anode body to reduce ESR), yet the welding process to form an electrical connection with an anode termination 35 can be carried out in a more efficient and cost-effective manner due to the reduced thickness/height or diameter of the second anode lead 70, particularly at second portion 72.

Further, once the capacitor element is formed and is attached to the terminations as discussed above, and once the excess length, if any, of the second portion 72 of the second anode lead 70 is trimmed, the capacitor element and anode lead assembly can be enclosed within a resin casing, which may then be filled with silica or any other known encapsulating material. The width and length of the case may vary depending on the intended application. However, the overall thickness of the casing is typically small so that the resultant assembly may be readily incorporated into low profile products (e.g., "IC cards"). For example, the thickness of the casing may range from about 4.0 millimeters or less, in some embodiments, from about 100 micrometers to about 2.5 millimeters, and in some embodiments, from about 150 micrometers to about 2.0 millimeters. Suitable casings may include, for instance, "A", "B", "H", or "T" cases (AVX Corporation). After encapsulation, exposed portions of the respective anode and cathode terminations may be aged, screened, and trimmed. If desired, the exposed portions may be optionally bent twice along the outside of the casing (e.g., at an approximately 90° angle).

As a result of the present disclosure, a capacitor may be formed that exhibits excellent electrical properties as determined by the test procedures described below. For example, the capacitor of the present invention can exhibit an ultralow ESR, such as about 300 milliohms (mΩ) or less, in some embodiments about 100 mΩ or less, in some embodiments from about 0.01 mΩ to about 50 mΩ, and in some embodiments, from about 0.1 mΩ to about 20 mΩ, determined at a frequency of 100 kHz and a temperature of 23° C.±2° C. In addition, the leakage current, which generally refers to the current flowing from one conductor to an adjacent conductor through an insulator, can be maintained at relatively low levels. For example, the numerical value of the normalized leakage current of a capacitor of the present invention is, in some embodiments, less than about 0.1 μA/μF*V, in some embodiments less than about 0.01 μA/μF*V, and in some embodiments, less than about 0.001 μA/μF*V, wherein μA is microamps and uF*V is the product of the capacitance and the rated voltage.

Test Procedures

Equivalent Series Resistance ("ESR")

ESR generally refers to the extent that the capacitor acts like a resistor when charging and discharging in an electronic circuit and is usually expressed as a resistance in series with the capacitor. ESR is typically measured using a Keithley 3330 Precision LCZ meter with Kelvin Leads 2.2 volt DC bias and a 0.5 volt peak to peak sinusoidal signal, at an operating frequency of 100 kHz and temperature of 23° C.±2° C.

Capacitance ("Cap")

The capacitance was measured using a Keithley 3330 Precision LCZ meter with Kelvin Leads with 2.2 volt DC bias and a 0.5 volt peak to peak sinusoidal signal. The operating frequency was 120 Hz and the temperature was 23° C.±2° C.

Leakage Current:

Leakage current ("DCL") was measured using a leakage test set that measures leakage current at a temperature of 23° C.±2° C. and at the rated voltage after a minimum of 30 seconds.

Laser Weld:

The laser weld was done using a Trumpf Nd:YaG HAAS laser (emitting near IR light at wavelength around 1,064 nanometers). The energy to weld generally refers to the amount of laser energy required to bond the anode lead to the anode termination component of a leadframe. The energy to weld is settled in Joules.

EXAMPLE 1

70,000 μFV/g tantalum powder was pressed into pellets to form a porous body having a length of 1.79 millimeters (mm), a width of 2.41 mm, and a thickness of 1.21 mm. The tantalum powder was charged into the hopper of a tantalum device automatic molding machine and automatically molded together with a first tantalum wire having a diameter of 0.50 mm (500 micrometers) and pressed to a density of 6.8 g/cm$^3$ to manufacture a porous body. 70% of the overall length of the anode lead was embedded in the porous anode body. The penetration of wire in the porous was 70% of the anode length. This molded body was left standing under reduced pressure at 1300° C. to obtain a sintered body.

The first tantalum wire was flattened and a second tantalum wire having a diameter of 0.19 mm (190 micrometers) was then welded together by a resistance welding process as in FIG. 6. Thereafter, the second, 0.19 mm diameter tantalum wire was welded to an auxiliary stainless steel strip.

The tantalum anode was anodized at 12.5 V in a liquid electrolyte of 0.1% phosphoric acid to make capacitors with 150 μF at 120 Hz. A conductive polymer coating was then formed by dipping the anode into a butanol solution of iron (III) toluenesulfonate (Clevios™ C, H.C. Starck) for 5 minutes and consequently into 3,4-ethylenedioxythiophene (Clevios™ M, H.C. Starck) for 1 minute. After 45 minutes of polymerization, a thin layer of poly(3,4-ethylenedioxythiophene) was formed on the surface of the dielectric. The anode was washed in methanol to remove reaction by-products, anodized in a liquid electrolyte, and washed again in methanol. This process was repeated 12 times. The part was then dipped into a graphite dispersion and dried. Finally, the part was dipped into a silver dispersion and dried. The finished part was completed by conventional assembly technology and then measured. A copper-based leadframe was used for finishing of the assembly process. Once the capacitor element was attached via a laser welding process to bond the anode lead wire to the anode termination, the length L2 of the second anode lead 40 was set to 0.80 mm. Next, the leadframe was enclosed with an encapsulating epoxy resin. Multiple parts (1370) of 150 μF/6.3V capacitors were made in this manner.

EXAMPLE 2

Capacitors were formed in the manner described in Example 1, except that the second tantalum wire having a diameter of 0.19 mm was welded together with the first tantalum wire having a diameter of 0.50 mm by the reference of FIG. 7. Multiple parts (1370) were made in this manner.

COMPARATIVE EXAMPLE 3

Capacitors were formed in the manner described in Example 1, except that only a single lead wire with a diameter of 0.19 mm was utilized. Multiple parts (5700) were made in this manner.

Table 1 below summarizes the characteristics of examples discussed above, including the tantalum wire diameters, the laser weld setting, the median DCL, the median capacitance, and the median ESR of the finished capacitors. As shown, Examples 1 and 2 had a lower ESR than Comparative Example 3.

TABLE 1

|  | First Ta wire Diameter [mm] | Second Ta Wire Diameter [mm] | Laser Weld Energy [J] | DCL [µA] | CAP [µF] | ESR [mΩ] |
| --- | --- | --- | --- | --- | --- | --- |
| Example 1 | 0.50 | 0.19 | 6.0 | 14.1 | 140.0 | 20.1 |
| Example 2 | 0.50 | 0.19 | 6.0 | 13.9 | 140.1 | 19.2 |
| Comparative Example 3 | 0.19 | — | 6.0 | 7.9 | 145.8 | 32.5 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A solid electrolytic capacitor, the solid electrolytic capacitor comprising:
    a capacitor element, wherein the capacitor element comprises a sintered, porous anode body; a dielectric layer overlying the sintered, porous anode body; and a cathode overlying the dielectric layer that includes a solid electrolyte; and
    an anode lead assembly, wherein the anode lead assembly comprises a first anode lead having an embedded portion positioned within the sintered, porous anode body and an external portion extending from a surface of the sintered, porous anode body in a longitudinal direction, wherein the external portion of the first anode lead includes a first external portion and a second external portion, wherein the second external portion includes a substantially planar surface, wherein the second external portion has a width that is greater than a width of the first external portion; and a second anode lead positioned external to the sintered, porous anode body, wherein the second anode lead comprises a first portion and a second portion, wherein the first portion has a substantially planar surface, wherein the substantially planar surface of the first portion of the second anode lead is connected to the substantially planar surface of the second external portion of the first anode lead;
    wherein the second portion of the second anode lead has a height that is smaller than a height of the embedded portion of the first anode lead, wherein the height of the second portion of the second anode lead is from about 10% to about 90% of the height of the embedded portion of the first anode lead.

2. The solid electrolytic capacitor of claim 1, wherein the first anode lead and the second anode lead include different materials.

3. The solid electrolytic capacitor of claim 1, wherein the first anode lead is tantalum and the second anode lead is a non-tantalum material.

4. The solid electrolytic capacitor of claim 1, wherein the second external portion of the first anode lead has a height that is smaller than a corresponding height of the first external portion of the first anode lead.

5. The solid electrolytic capacitor of claim 1, wherein the first portion of the second anode lead has a width that is greater than a width of the second portion of the second anode lead.

6. The solid electrolytic capacitor of claim 1, wherein the first portion of the second anode lead has a height that is smaller than a corresponding height of the second portion of the second anode lead.

7. The solid electrolytic capacitor of claim 1, wherein the substantially planar surface of the first portion of the second anode lead is connected to the substantially planar surface of the second external portion of the first anode lead by resistance welding.

8. The solid electrolytic capacitor of claim 1, further comprising an anode termination, wherein the second portion of the second anode lead is connected to the anode termination by laser welding.

9. The solid electrolytic capacitor of claim 1, further comprising a cathode termination that is electrically connected to the cathode.

10. The solid electrolytic capacitor of claim 1, wherein the anode body is formed from a powder having a specific charge of from about 10,000 µF*V/g to about 600,000 µF*V/g, wherein the powder comprises tantalum, niobium, aluminum, hafnium, titanium, an electrically conductive oxide thereof, or an electrically conductive nitride thereof.

11. The solid electrolytic capacitor of claim 1, further comprising a second capacitor element and a second anode lead assembly, wherein the second capacitor element comprises a sintered, porous anode body; a dielectric layer overlying the sintered, porous anode body; and a cathode overlying the second dielectric layer that includes a solid electrolyte; and wherein the second anode lead assembly comprises a third anode lead having an embedded portion positioned within the sintered, porous anode body and an external portion extending from a surface of the sintered, porous anode body in a longitudinal direction, wherein the external portion includes a substantially planar surface; and a fourth anode lead positioned external to the sintered, porous anode body, wherein the fourth anode lead comprises a first portion and a second portion, wherein the first portion has a substantially planar surface, wherein the substantially planar surface of the first portion of the fourth anode lead is connected to the substantially planar surface of the external portion of the third anode lead.

12. A method for forming a solid electrolytic capacitor, the method comprising:
    positioning a first anode lead within a powder formed from a valve metal composition such that the first anode lead includes an embedded portion located within a porous anode body and an external portion extending from a surface of the porous anode body in a longitudinal direction, wherein the external portion of the first anode lead includes a first external portion and a second external portion, wherein the second external portion includes a substantially planar surface, wherein the second external portion includes a substantially planar surface, wherein the second external portion has a width that is greater than a width of the first external portion;

compacting the powder around the embedded portion of the first anode lead;

sintering the compacted powder to form a sintered, porous anode body;

positioning a second anode lead external to the sintered, porous anode body, wherein the second anode lead comprises a first portion and a second portion, wherein the first portion includes a substantially planar surface;

wherein the second portion of the second anode lead has a height that is smaller than a height of the embedded portion of the first anode lead, wherein the height of the second portion of the second anode lead is from about 10% to about 90% of the height of the embedded portion of the first anode lead;

connecting the substantially planar surface of the first portion of the second anode lead to the substantially planar surface of the second external portion of the first anode lead; and connecting the second portion of the second anode lead to an anode termination to form an electrical connection between the second portion of the second anode lead and the anode termination.

13. The method of claim 12, further comprising trimming excess anode lead material from the second anode lead after welding the second portion of the second anode lead to the anode termination.

14. The method of claim 12, wherein the substantially planar surface of the second external portion of the first anode lead is formed by flattening or crimping the first anode lead.

15. The method of claim 12, wherein the second portion of the second anode lead has a height that is smaller than a height of the embedded portion of the first anode lead.

16. The method of claim 12, wherein the first portion of the second anode lead is connected to the second external portion of the first anode lead by resistance welding.

17. The method of claim 12, wherein the second portion of the second anode lead is connected to the anode termination by laser welding.

18. The method of claim 12, wherein the substantially planar surfaces are formed by flattening, crimping, or compression.

19. The method of claim 12, further comprising:
anodically oxidizing the sintered, porous anode body to form a dielectric layer; and
applying a solid electrolyte to the anodically oxidized sintered, porous anode body to form a cathode.

20. The method of claim 19, further comprising:
forming an electrical connection between the cathode and a cathode termination; and
encapsulating the capacitor with a molding material such that at least a part of the anode termination and a part of the cathode termination remain exposed.

21. The method of claim 12, the method further comprising:
positioning a third anode lead within a powder formed from a valve metal composition such that the third anode lead includes an embedded portion located within a second porous anode body and an external portion extending from a surface of the second porous anode body in a longitudinal direction, wherein the external portion includes a substantially planar surface;
compacting the powder around the embedded portion of the third anode lead;
sintering the compacted powder to form a second sintered, porous anode body;
positioning a fourth anode lead external to the second sintered, porous anode body, wherein the fourth anode lead comprises a first portion and a second portion, wherein the first portion includes a substantially planar surface;
connecting the substantially planar surface of the first portion of the fourth anode lead to the substantially planar surface of the external portion of the third anode lead; and
connecting the second portion of the fourth anode lead to the anode termination to form an electrical connection between the second portion of the fourth anode lead and the anode termination.

* * * * *